H. J. BERRINGER.
FENDER LAMP.
APPLICATION FILED JUNE 6, 1921.
1,422,528.
Patented July 11, 1922.
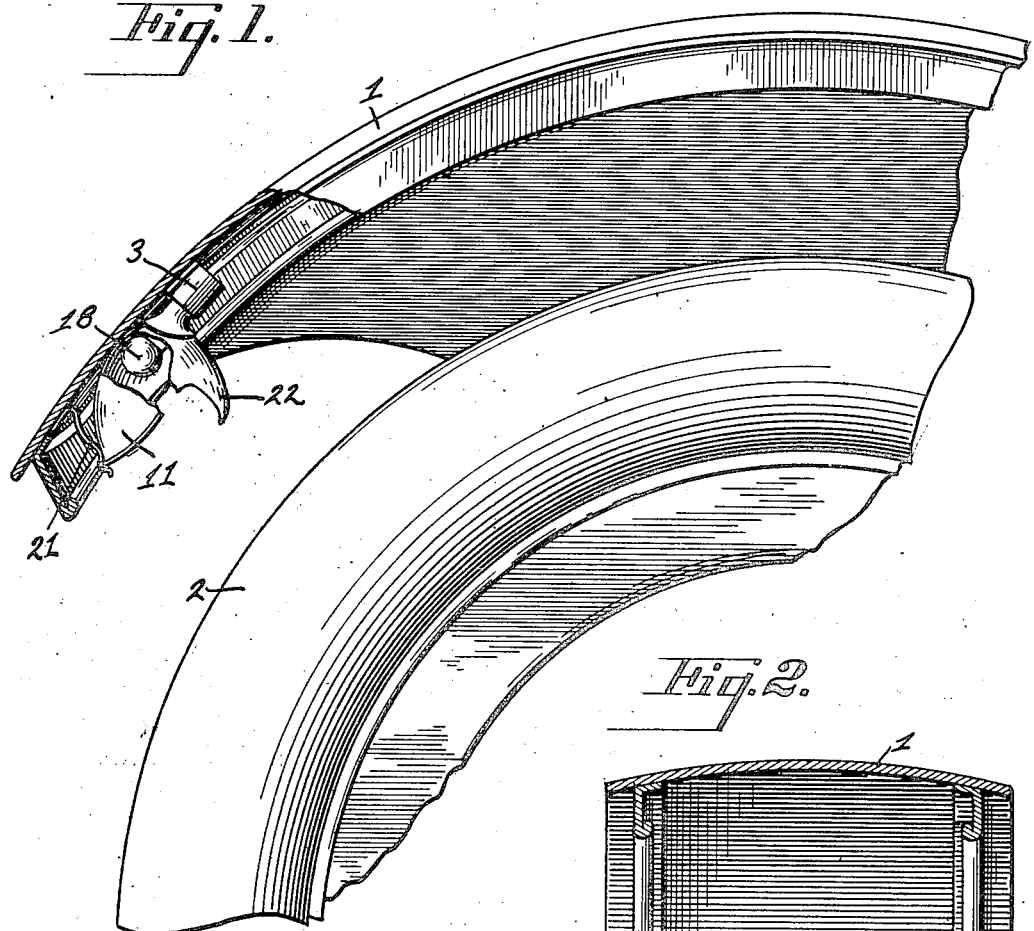
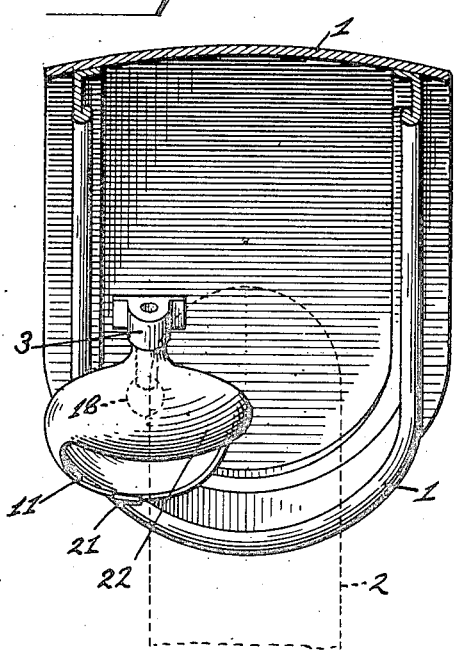
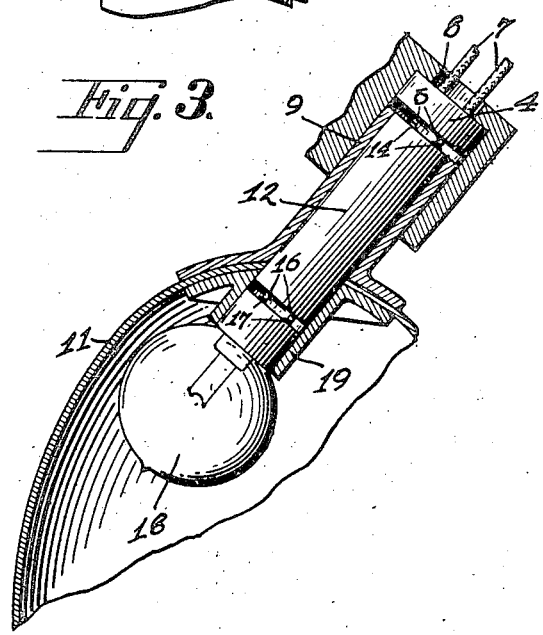
Inventor
Henry J. Berringer
By Arthur L. Slee.
Atty.

UNITED STATES PATENT OFFICE.

HENRY J. BERRINGER, OF SAN FRANCISCO, CALIFORNIA.

FENDER LAMP.

1,422,528.　　　　　Specification of Letters Patent.　　Patented July 11, 1922.

Application filed June 6, 1921. Serial No. 475,469.

*To all whom it may concern:*

Be it known that I, HENRY J. BERRINGER, a citizen of the United States, residing in the city and county of San Francisco and State of California, have invented a new and useful Improvement in a Fender Lamp, of which the following is a specification.

My invention relates to improvements in fenders for vehicles wherein lamp engaging means are provided for detachably mounting a lamp in position for illuminating the outer side of a wheel.

The primary object of my invention is to provide an improved means for illuminating a vehicle wheel to render the same visible at night to the drivers of approaching vehicles in order that they may gage the clearance required for passing.

Another object of my invention is to provide an improved fender lamp arranged to be detachably connected to any fender of a vehicle for illuminating the adjacent wheel to facilitate the changing and repair of tires at night.

A further object is to provide an improved fender lamp provided with a visor to deflect mud and the like thrown from the wheel away from the lamp.

I accomplish these and other objects by means of the device disclosed in the drawings forming a part of the present specification wherein like characters of reference are used to designate similar parts throughout said specification and drawings, and in which:

Fig. 1 is a broken side elevation of a wheel and fender provided with my improved fender light.

Fig. 2 is a transverse section of the fender disclosed in Fig. 1, the wheel being indicated in dotted lines.

Fig. 3 is an enlarged broken detail of the lamp and reflector engaging means.

Referring to the drawings the numeral 1 is used to designate in general a fender mounted adjacent a wheel 2 of a vehicle. Upon the under side of the fender and near the outer edge thereof is secured a socket 3 having a plug 4 mounted therein and provided with electric contacts 6 connected by wires 7 extending outwardly through an aperture 8 in the back of the socket 3 to any suitable source of electrical energy not shown.

The socket 3 is arranged to receive the end of a sleeve 9 secured upon a reflector 11. A connection plug 12 provided with contacts 14 adapted for engagement with the contacts 6 of the plug 7 is mounted within the sleeve 9, the other end of the plug 12 being provided with lamp contacts 16 arranged to engage the contacts 17 of a suitable lamp bulb 18 frictionally engaged by a lamp receiving socket 19 secured upon the inner side of the reflector 11 in alignment with the sleeve 9.

A spring clamp 21 is secured upon the fender 1 to engage the forward portion of the reflector 11 to detachably retain the reflector and lamp 18 in operative position with the sleeve 9 engaged by the socket 3, and the contacts 6 and 14, and 16 and 17 in operative engagement. The clamp 21 may be manually receded to permit the withdrawal of the reflector 11 from the socket 3.

The reflector 11 is provided with a depending portion 22 formed adjacent the sleeve 9 to form a visor extending downwardly between the lamp 18 and the reflector 11 to a point slightly below a tangent from the wheel 2 to the tip of the reflector to deflect mud and the like thrown off from the wheel 2 away from the lamp.

In practice I purpose to provide each of the fenders of a vehicle with sockets 3 and clamps 22 as above described, the sockets being arranged upon the under side and at the outer edge of each fender in order that when a reflector 11 and lamp 18 is mounted therein the center of the lamp will be positioned outside of the side of the wheel thereby illuminating the outer side of the wheel.

When driving at night, the light from the headlights of a vehicle is so blinding to the driver of an approaching vehicle to render the vehicle entirely invisible, the approaching driver being forced to gage the clearance for passing by approximating the distance from the headlight to the edge of the vehicle. However, any portion of the vehicle illuminated in back of the headlight is rendered visible to the approaching driver who then has accurate means for observing his clearance in passing. The lamp 18 is therefore intended to be normally mounted upon the left hand front fender to illuminate the outer side of the left front wheel, thereby clearly defining from the most convenient point the position of the vehicle to the approaching driver.

In case it is necessary to change a tire or make repairs upon the tire of any wheel, the reflector 11 and lamp 18 may be readily removed from its normal position upon the left hand front fender and positioned upon the fender adjacent the tire to be changed, thereby providing light by which the work may be conveniently performed.

Having thus described my invention what I claim as new and desire to secure by Letters Patent is:

1. The combination with a fender arranged to be mounted adjacent the wheel of a vehicle and provided with a lamp engaging socket secured upon the under side thereof, of a reflector removably engaged by the socket; an electric lamp mounted within the reflector; means carried by the reflector arranged to form electrical connection between the lamp and the socket when the reflector is engaged by said socket; and a spring clip secured upon the fender to engage the reflector and retain the same in engagement with said socket.

2. The combination with a motor vehicle and the fenders thereof, of a socket secured upon the under side of each fender; a reflector arranged to be removably engaged by any of said sockets; a lamp mounted within the reflector; and means carried by the reflector arranged to form electrical connection between the lamp and a socket when said reflector is placed in engagement with the socket upon any of said fenders.

3. The combination with a motor vehicle and the fenders thereof, of a socket secured upon the under side of each fender; a reflector arranged to be removably engaged by any of said sockets; a lamp mounted within the reflector; a plug mounted within the reflector and having contacts at each end thereof to engage and form electrical connection between the lamp and the socket when said reflector is placed in engagement with the socket upon any of said fenders; and means mounted upon the fender to engage and retain the reflector in removable engagement with any of the sockets.

In witness whereof I hereunto set my signature.

HENRY J. BERRINGER.